United States Patent
Bolanos et al.

(10) Patent No.: US 11,521,617 B2
(45) Date of Patent: Dec. 6, 2022

(54) SPEECH-TO-TEXT AUTO-SCALING FOR LIVE USE CASES

(71) Applicant: INTERNATIONAL BUSINESS MACHINES CORPORATION, Armonk, NY (US)

(72) Inventors: Daniel Bolanos, Mohegan Lake, NY (US); Antonio Rogelio Lee, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 250 days.

(21) Appl. No.: 17/010,866

(22) Filed: Sep. 3, 2020

(65) Prior Publication Data
US 2022/0068280 A1   Mar. 3, 2022

(51) Int. Cl.
*G10L 15/28* (2013.01)
*G06F 9/50* (2006.01)
*G10L 15/26* (2006.01)

(52) U.S. Cl.
CPC .......... *G10L 15/285* (2013.01); *G06F 9/5077* (2013.01); *G06F 9/5083* (2013.01); *G10L 15/26* (2013.01)

(58) Field of Classification Search
CPC ..... G10L 15/285; G10L 15/26; G06F 9/5077; G06F 9/5083
See application file for complete search history.

(56) References Cited

U.S. PATENT DOCUMENTS 6,629,075 B1 * 9/2003 Schalkwyk ........... G10L 15/285
704/E15.048
6,728,677 B1 * 4/2004 Kannan ................. G10L 15/285
704/E15.048

(Continued)

FOREIGN PATENT DOCUMENTS

EP          3289459 A1      3/2018
JP       2019028538 A       2/2019

OTHER PUBLICATIONS

Disclosed Anonymously, "Method and System for Recording, Analyzing, Summarizing and Archiving Lectures in Cloud Using Edge Computation in Real-Time," IPCOM000256616D, Publication Date Dec. 16, 2018, 4 pages.

(Continued)

*Primary Examiner* — Brian L Albertalli
(74) *Attorney, Agent, or Firm* — Robert R. Aragona

(57) ABSTRACT

An embodiment for speech-to-text auto-scaling of computational resources is provided. The embodiment may include computing a delta for each word in a transcript between a wall clock time and a time when the word is delivered to a client. The embodiment may also include submitting the deltas to a group of metrics servers. The embodiment may further include requesting from the group of metrics servers current values of the deltas. The embodiment may also include determining whether the current values of the deltas exceed a pre-defined max-latency threshold. The embodiment may further include adjusting the allocated computational resources based on a frequency of the current values of the deltas that exceed the pre-defined max-latency threshold. The embodiment may also include creating a histogram from the current values of the deltas and scaling-up the allocated computational resources based on a percentage of (Continued)

data points that fall above the pre-defined max-latency threshold.

20 Claims, 5 Drawing Sheets

(56) References Cited

U.S. PATENT DOCUMENTS

| | | | | |
|---|---|---|---|---|
| 9,064,495 | B1* | 6/2015 | Torok | G10L 15/01 |
| 9,069,606 | B2 | 6/2015 | Donahue | |
| 9,183,560 | B2 | 11/2015 | Abelow | |
| 9,269,355 | B1* | 2/2016 | Seeker-Walker | G10L 15/30 |
| 9,332,028 | B2 | 5/2016 | Xaypanya | |
| 9,514,747 | B1* | 12/2016 | Bisani | G10L 25/60 |
| 9,769,085 | B2 | 9/2017 | Laribi | |
| 10,193,822 | B1 | 1/2019 | Bacus | |
| 2007/0143116 | A1* | 6/2007 | De Armas | G06F 9/505 |
| | | | | 704/270.1 |
| 2010/0312556 | A1* | 12/2010 | Ljolje | G10L 15/07 |
| | | | | 704/244 |
| 2017/0011232 | A1 | 1/2017 | Xue | |
| 2021/0074300 | A1* | 3/2021 | Macallum | G10L 15/32 |
| 2021/0217410 | A1* | 7/2021 | Khalil | G10L 15/32 |

OTHER PUBLICATIONS

Disclosed Anonymously, "Method for Real-Time Voice Communication," IPCOM000255169D, Publication Date Sep. 6, 2018, 23 pages.
Disclosed Anonymously, "System and Method for Reminding Words to People With Short-Term-Memory Issues," IPCOM000259154D, Publication Date Jul. 16, 2019, 9 pages.
Han, "Investigations into Elasticity in Cloud Computing," Imperial College London, Department of Computing, Nov. 2013, pp. i-211.
Mell et al., "The NIST Definition of Cloud Computing", National Institute of Standards and Technology, Special Publication 800-145, Sep. 2011, 7 pages.
Singh et al.; "Research on Auto-Scaling of Web Applications in Cloud: Survey, Trends and Future Directions," Scalable Computing, May 2019, DOI: 10.12694/scpe.v20i2.1537, 34 pages.

* cited by examiner

SPEECH-TO-TEXT AUTO-SCALING FOR LIVE USE CASES

BACKGROUND

The present invention relates generally to the field of computing, and more particularly to a speech-to-text auto-scaling system.

Speech-to-Text relates to the field of transcribing words into textual form based on spoken language. Real use cases may include, but are not limited to, closed-captioning, automated agents, and dictation. In these types of cases, a natural and smooth interaction between a user and a cloud-based speech-to-text service is desired. Live interaction between the user and the cloud-based speech-to-text service requires fast and efficient delivery of recognition transcripts by a speech recognition engine. It is desirable for backend servers running in a remote datacenter to have enough headroom, i.e., available computational resources, to accommodate dynamic central processing unit (CPU) requirements of the speech recognition engine. It may therefore be imperative to have a system in place to dynamically generate metrics that correlate with a user experience and the computational resources needed at any given time in order to allocate the computational resources and preserve latency.

SUMMARY

According to one embodiment, a method, computer system, and computer program product for speech-to-text auto-scaling of computational resources is provided. The embodiment may include computing a delta for each word in a transcript. The computed delta may be for each word in a transcript between a wall clock time and a time when the word is delivered to a client. The embodiment may also include submitting the deltas to a group of metrics servers, where the metrics servers are configured to collect the deltas. The embodiment may further include requesting from the group of metrics servers current values of the deltas. The embodiment may also include determining whether the current values of the deltas exceed a pre-defined max-latency threshold. The embodiment may further include adjusting the allocated computational resources based on a frequency of the current values of the deltas that exceed the pre-defined max-latency threshold. The embodiment may also include creating a histogram from the current values of the deltas. The embodiment may further include, in response to creating the histogram, performing a scale-up of the allocated computational resources based on a percentage of data points that fall above the pre-defined max-latency threshold.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
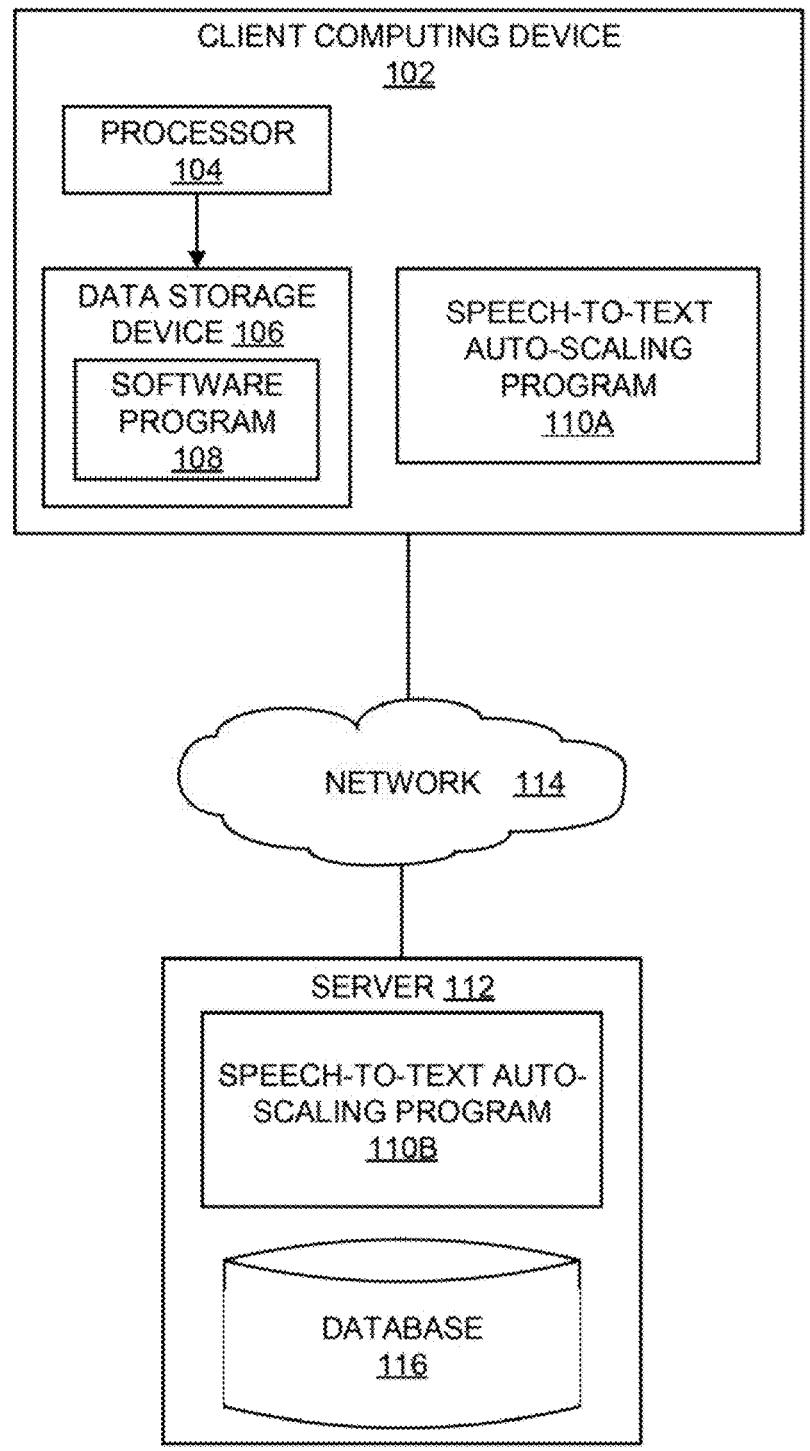
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to a speech-to-text auto-scaling system. The following described exemplary embodiments provide a system, method, and program product to, among other things, utilize speech-to-text and natural language processing (NLP) to dynamically generate metrics that correlate with the user experience and the computational resources needed at any given time and, accordingly, allocate the computational resources necessary to keep latency within an acceptable range. It may be appreciated that "computational resources" and "backend servers" are used interchangeably herein. Therefore, the present embodiment has the capacity to improve the technical field of speech-to-text auto-scaling by allowing a natural and smooth interaction between the user and a cloud-based speech-to-text service.

As previously described, speech-to-text relates to the field of transcribing words into textual form based on spoken language. Real-time guarantees and in particular user-perceived latency are central to the user experience in all speech-to-text use cases that involve a live interaction between the user and the cloud-based speech-to-text service. Real use cases may include, but are not limited to, closed-captioning, automated agents, and dictation. In these types of cases, recognition transcripts must be delivered by a speech recognition engine with little delay. However, between an audio source and the speech recognition engine running in a remote datacenter, several factors contribute to latency degradation, such as backend servers lacking headroom in terms of available computational resources to accommodate the dynamic central processing unit (CPU) requirements of the speech recognition engine. This problem is typically addressed by over allocating the computational resources to cover a worst-case scenario of a difficult to process audio stream. The amount of computational resources, typically CPU, required by the speech recognition engine to produce a stream of transcripts in real time with low latency greatly varies across the audio streams processed by the backend servers. Factors relating to the amount of computational resources required may include, but are not limited to, speaker characteristics, style, cross-talk, silence regions, background noise, traffic patterns, and collocated workloads, i.e., other applications or other instances of the speech recognition engine running on a same host machine that are competing for computational resources. As such, it may be advantageous to, among other things, proactively take measures to handle these factors by automatically scaling up or down a number of the backend servers in order to make the available computational resources match traffic coming in from the users. Thus, computational resources may be allocated based on need and latency as well as cost are kept within the acceptable range.

According to at least one embodiment, a delta for each word in the recognition transcript may be computed. The computed delta may be a time difference between a wall clock time when audio for the word is sent to the speech recognition engine, and the time when the word is delivered to a client, i.e., an application layer. The deltas may be submitted to a group of metrics servers which are configured to collect the deltas. A group of horizontal auto-scalers may periodically request from the metrics servers current values of the deltas. In at least one embodiment, if the current values of the deltas exceed a pre-defined maximum-latency (max-latency) threshold, the group of horizontal auto-scalers may trigger a scale-up operation and add more computational resources to the speech recognition engine running in the remote datacenter. The computational resources may be added incrementally until the current values of the deltas fall within the acceptable range for latency. In at least one other embodiment, if the current values of the deltas fall below a pre-defined minimum-latency (min-latency) threshold, the group of horizontal auto-scalers may trigger a scale-down operation and reduce the computational resources allocated to the speech recognition engine running in the remote datacenter. Likewise, the computational resources may be reduced incrementally until the current values of the deltas fall within the acceptable range for latency.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to determine in real time whether the allocated computational resources are sufficient to keep latency within the acceptable range or whether the allocated computational resources require adjustment.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a speech-to-text auto-scaling program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 3, the client computing device 102 may include internal components 302a and external components 304a, respectively.

The server computer 112 may be a laptop computer, netbook computer, personal computer (PC), a desktop computer, or any programmable electronic device or any network of programmable electronic devices capable of hosting and running a speech-to-text auto-scaling program 110B and a database 116 and communicating with the client computing device 102 via the communication network 114, in accordance with embodiments of the invention. As will be discussed with reference to FIG. 3, the server computer 112 may include internal components 302b and external components 304b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the speech-to-text auto-scaling program 110A, 110B may be a program capable of computing a delta for each word in a transcript between a wall clock time and a time when the word is delivered to a client, i.e., an application layer, submitting the deltas to a group of metrics servers configured to collect the deltas, requesting from the metrics servers current values of the deltas, determining whether the current values of the deltas exceed a pre-defined threshold, and adjusting computational resource allocation based on a frequency of the current values of the deltas that exceed the pre-defined threshold. The speech-to-text auto-scaling method is explained in further detail below with respect to FIG. 2.

Figure 2:
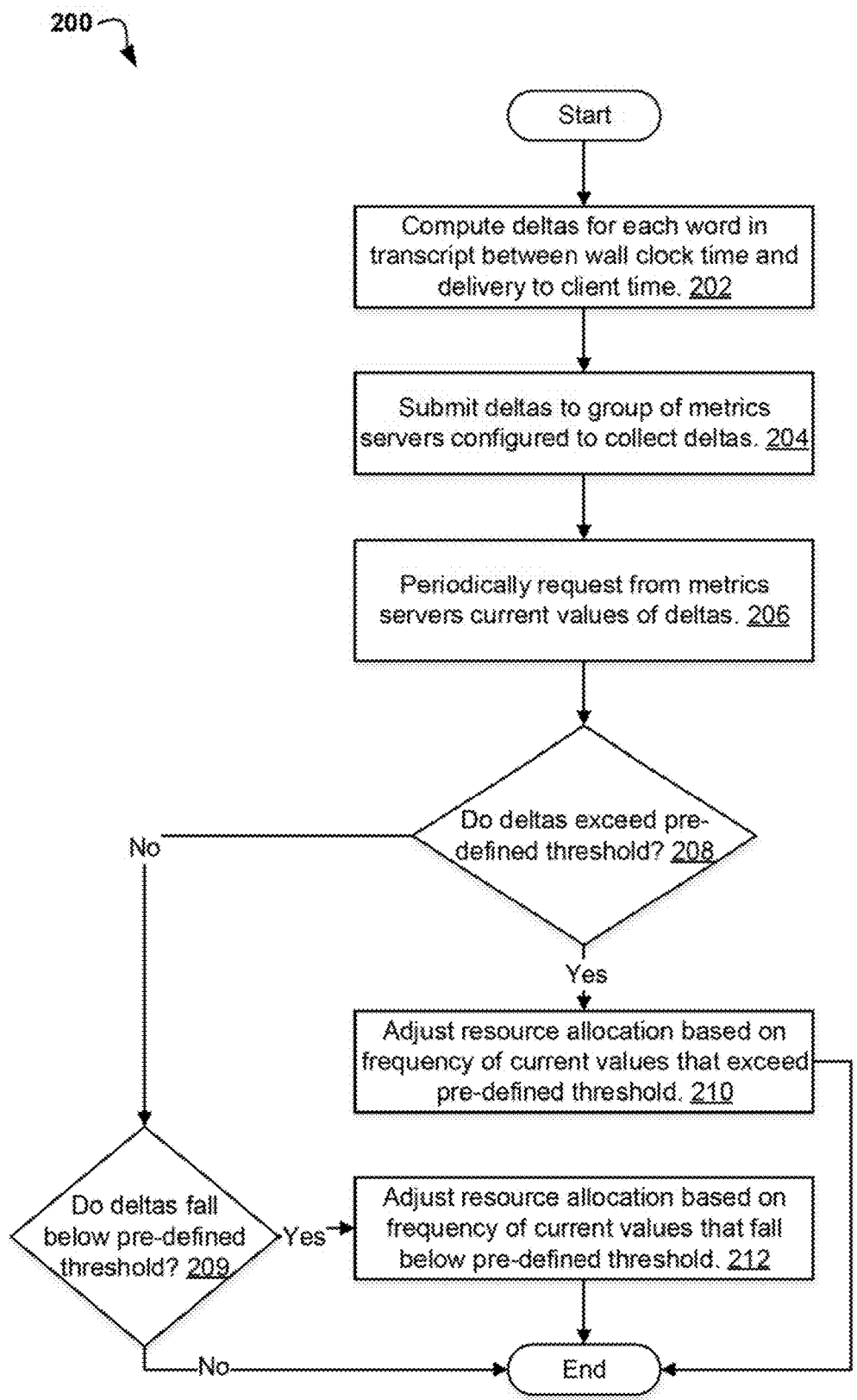
FIG. 2 illustrates an operational flowchart for allocating computational resources in a speech-to-text auto-scaling process according to at least one embodiment.

Referring now to FIG. 2, an operational flowchart for allocating computational resources in a speech-to-text auto-scaling process 200 is depicted according to at least one embodiment. At 202, the speech-to-text auto scaling program 110A, 110B computes the delta for each word in the recognition transcript. The computed deltas may be a time difference between the wall clock time when the audio for the word is sent to the speech recognition engine, and the time when the word is delivered to the client, i.e., the application layer. The audio may be considered sent to the speech recognition engine the moment the word is spoken by the user. Likewise, the audio may be considered delivered to the client the moment the word is transcribed. For example, if a word is spoken and timestamped at 1:00:00 p.m. and the same word is transcribed and timestamped at 1:00:12 p.m., the computed delta may be determined to be 12 seconds. The computed deltas may be an end-to-end latency measurement that expresses quality of service in terms of latency as experienced by the user for a particular audio session.

In at least one other embodiment, in order to obtain a global estimate of latency, a histogram may be created from the current values of the deltas. Thus, the scale-up or scale-down of the computational resources may be based on a percentage of data points that fall above the pre-defined max-latency threshold. For example, if 5% of the computed deltas are above X seconds, the speech-to-text auto-scaling program 110A, 110B may scale-up the number of backend servers by Y percent. The pre-defined max-latency threshold and the pre-defined min-latency threshold may be changed in accordance with user cases having different sensitivities to latency. For example, in an audio session where there is cross-talk and background noise, the pre-defined max-latency threshold may be lowered in order do devote more computational resources to that particular session.

Then, at 204, the speech-to-text auto-scaling program 110A, 110B submits the current values of the deltas to the group of metrics servers which are configured to collect the deltas. The current values of the deltas may be submitted via inter-process communication, in which the speech-to-text auto-scaling program 110A, 110B sends a request, and the group of metrics servers respond to the request. For example, the speech-to-text auto-scaling program 110A, 110B may send the current values of the deltas to the metrics servers, and the metrics servers may accept the submission of these current values.

Next, at 206, the speech-to-text auto-scaling program 110A, 110B causes the group of horizontal auto-scalers to periodically request from the metrics servers the current values of the deltas. For example, the request may be made every 10 seconds. According to at least one other embodiment, the timing of the periodic request may be changed. For example, the group of horizontal auto-scalers may make the request every 8 seconds or every 12 seconds. The group of horizontal auto-scalers may utilize a metrics application programming interface (API) in order to obtain the current values of the deltas from the metrics servers. The metrics API may be a software intermediary which sends a request and delivers a response analogous to the inter-process communication described above. For example, the group of horizontal auto-scalers may request from the metrics servers the current values of the deltas every 10 seconds, and the API may deliver the current values back to the group of horizontal auto-scalers.

In at least one other embodiment, the metrics servers may be configured to send the current values of the deltas to the group of horizontal auto-scalers without the request from the group of horizontal auto-scalers. The group of metrics servers may utilize the metrics API described above to send the current values of the deltas to the group of horizontal auto-scalers. For example, the metrics servers may submit the current values of the deltas to the group of horizontal auto-scalers, and the group of horizontal auto-scalers may accept the submission of the current values of the deltas.

Then, at 208, the speech-to-text auto-scaling program 110A, 110B determines whether the current values of the deltas exceed the pre-defined maximum-latency (max-latency) threshold. The determination may be made based on an analysis of how many deltas exceed the pre-defined max-latency threshold and how many deltas fall below the pre-defined minimum-latency (min-latency) threshold. If the speech-to-text auto-scaling program 110A, 110B determines that the current values of the deltas exceed the pre-defined max-latency threshold, then the speech-to-text auto-scaling process proceeds to step 210 to adjust computational resource allocation based on the frequency of the current values of the deltas that exceed the pre-defined max-latency threshold.

In at least one other embodiment, at 209, the speech-to-text auto-scaling program 110A, 110B determines whether the current values of the deltas fall below the pre-defined min-latency threshold. If the speech-to-text auto-scaling program 110A, 110B determines that the current values of the deltas fall below the pre-defined min-latency threshold, then the speech-to-text auto-scaling process proceeds to step 212 to adjust computational resource allocation based on the frequency of the current values of the deltas that fall below the pre-defined min-latency threshold.

Next, at 210, the speech-to-text auto-scaling program 110A, 100B adjusts the allocation of computational resources based on the frequency of the current values of the deltas that exceed the pre-defined max-latency threshold. For example, if the pre-defined max-latency threshold is exceeded more than Y times during at least Z seconds, the group of horizontal auto-scalers may trigger the scale-up operation and add more computational resources to the speech recognition engine running in the remote datacenter. A default number of computational resources may be initially allocated to the speech recognition engine before the current values of the deltas are available. For example, at least one computational resource may be allocated to the speech recognition engine at the start of the audio session. The group of horizontal auto-scalers may trigger the scale-up operation by sending a signal to monitoring circuitry inside the backend servers in order to boot up the backend servers. The computational resources may be added incrementally until the current values of the deltas fall within the acceptable range for latency.

In at least one other embodiment, a maximum number of computational resources may be allocated to the speech recognition engine to prevent over-allocation of the computational resources to any one audio session. The speech-to-text auto-scaling program 110A, 110B may be configured to throttle new audio session requests from the users in order to guarantee the quality of service of the already established audio sessions. For example, if 90% of the available computational resources are currently allocated to all of the audio sessions combined, then the speech-to-text auto-scaling program 110A, 110B may throttle new audio session requests.

In at least one other embodiment, at 212, the speech-to-text auto-scaling program 110A, 110B adjusts the allocation of computational resources based on the frequency of the current values of the deltas that fall below the pre-defined minimum-latency (min-latency) threshold. For example, if the pre-defined min-latency threshold is not exceeded more than Y times during at least Z seconds, the group of horizontal auto-scalers may trigger the scale-down operation and reduce the computational resources allocated to the speech recognition engine running in the remote datacenter. The group of horizontal auto-scalers may trigger the scale-down operation by sending a signal to the monitoring circuitry inside the backend servers in order to power down the backend servers. Likewise, the computational resources may be reduced incrementally until the current values of the deltas fall within the acceptable range for latency.

In at least one other embodiment, a minimum number of computational resources may be allocated to the speech recognition engine so as not to significantly affect the quality of service of the audio sessions. For example, at least 10% of available computational resources may be allocated to the speech recognition engine at any given time. Therefore, even if the current values of the deltas fall within the acceptable range for latency, a number of computational resources may be devoted to each audio session to guarantee the quality of service.

It may be appreciated that FIG. 2 provides only an illustration of one implementation and does not imply any limitations with regard to how different embodiments may be implemented. Many modifications to the depicted environments may be made based on design and implementation requirements.

Figure 3:
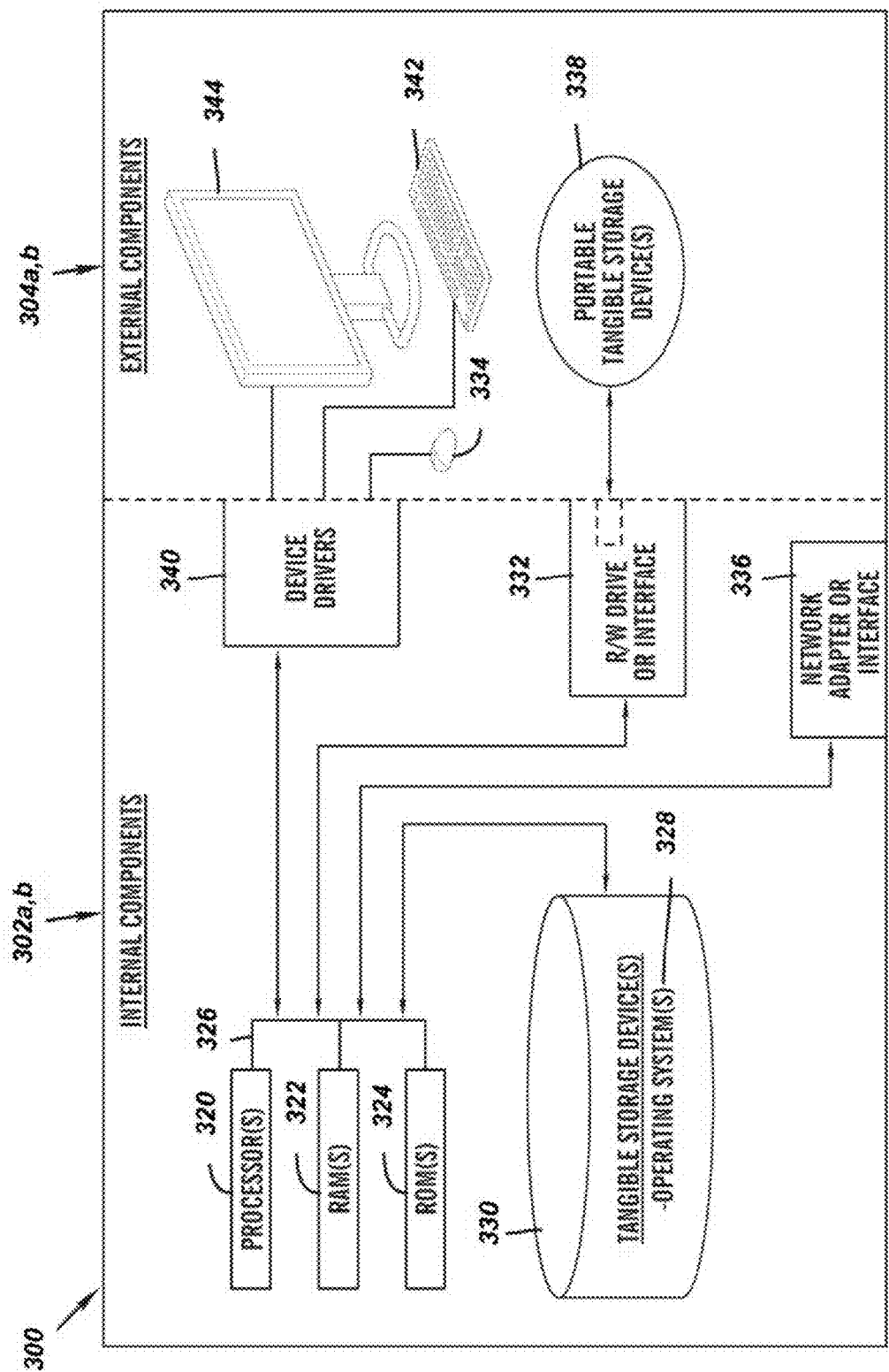
FIG. 3 is a functional block diagram of internal and external components of computers and servers depicted in FIG. 1 according to at least one embodiment.

FIG. 3 is a block diagram 300 of internal and external components of the client computing device 102 and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 302, 304 is representative of any electronic device capable of executing machine-readable program instructions. The data processing system 302, 304 may be representative of a smart phone, a computer system, PDA, or other electronic devices. Examples of computing systems, environments, and/or configurations that may represented by the data processing system 302, 304 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 302 a,b and external components 304 a,b illustrated in FIG. 3. Each of the sets of internal components 302 include one or more processors 320, one or more computer-readable RAMs 322, and one or more computer-readable ROMs 324 on one or more buses 326, and one or more operating systems 328 and one or more computer-readable tangible storage devices 330. The one or more operating systems 328, the software program 108 and the speech-to-text auto-scaling program 110A in the client computing device 102 and the speech-to-text auto-scaling program 110B in the server 112 are stored on one or more of the respective computer-readable tangible storage devices 330 for execution by one or more of the respective processors 320 via one or more of the respective RAMs 322 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store a computer program and digital information.

Each set of internal components 302 a,b also includes a R/W drive or interface 332 to read from and write to one or more portable computer-readable tangible storage devices 338 such as a CD-ROM, DVD, memory stick, magnetic tape, magnetic disk, optical disk or semiconductor storage device. A software program, such as the speech-to-text auto-scaling program 110A, 110B, can be stored on one or more of the respective portable computer-readable tangible storage devices 338, read via the respective R/W drive or interface 332, and loaded into the respective hard drive 330.

Each set of internal components 302 a,b also includes network adapters or interfaces 336 such as a TCP/IP adapter cards, wireless Wi-Fi interface cards, or 3G or 4G wireless interface cards or other wired or wireless communication links. The software program 108 and the speech-to-text auto-scaling program 110A in the client computing device 102 and the speech-to-text auto-scaling program 110B in the server 112 can be downloaded to the client computing device 102 and the server 112 from an external computer via a network (for example, the Internet, a local area network or other, wide area network) and respective network adapters or interfaces 336. From the network adapters or interfaces 336, the software program 108 and the speech-to-text auto-scaling program 110A in the client computing device 102 and the speech-to-text auto-scaling program 110B in the server 112 are loaded into the respective hard drive 330. The network may comprise copper wires, optical fibers, wireless transmission, routers, firewalls, switches, gateway computers and/or edge servers.

Each of the sets of external components 304 a,b can include a computer display monitor 344, a keyboard 342, and a computer mouse 334. External components 304 a,b can also include touch screens, virtual keyboards, touch pads, pointing devices, and other human interface devices. Each of the sets of internal components 302 a,b also includes device drivers 340 to interface to computer display monitor 344, keyboard 342, and computer mouse 334. The device drivers 340, R/W drive or interface 332, and network adapter or interface 336 comprise hardware and software (stored in storage device 330 and/or ROM 324).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
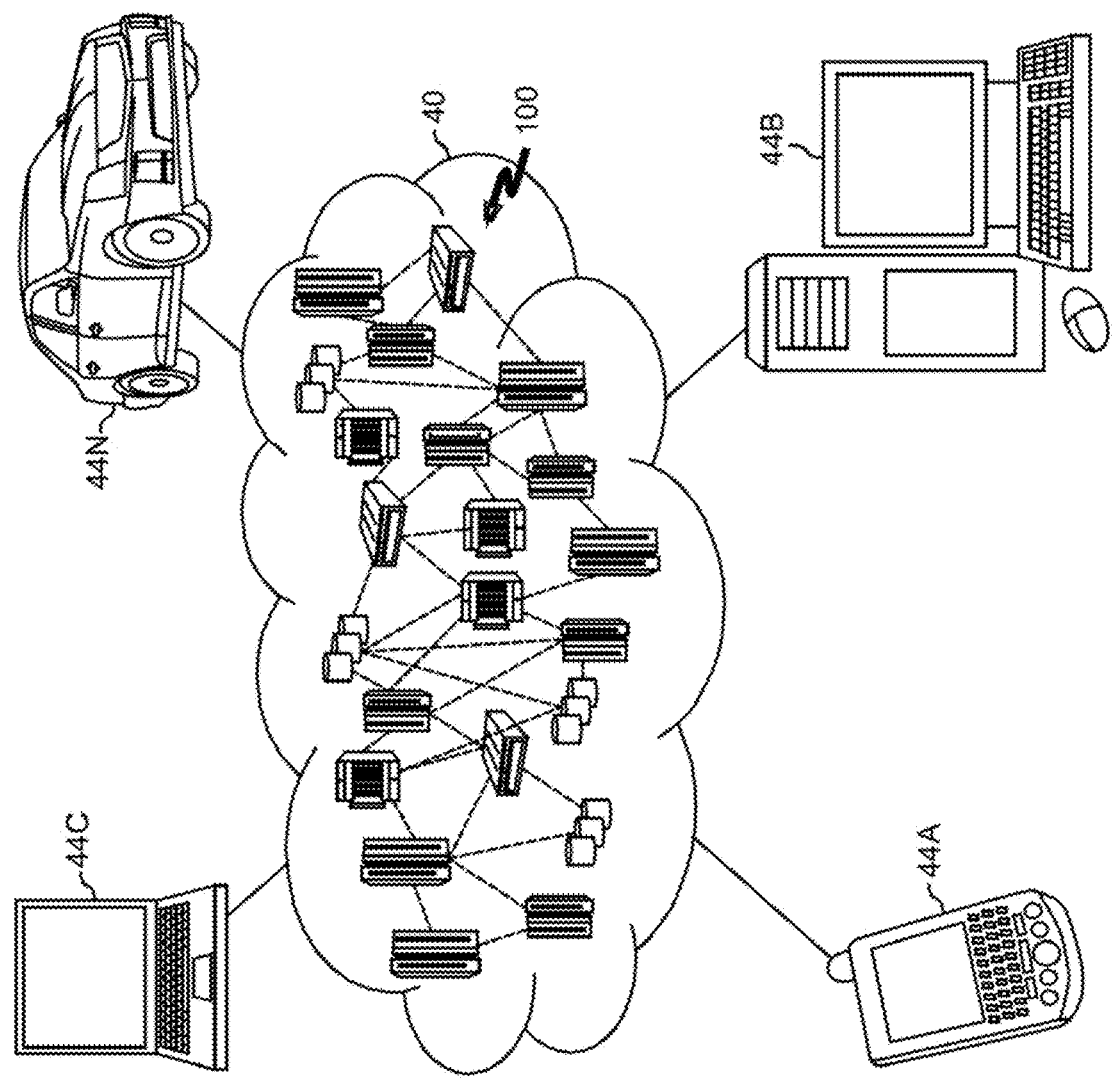
FIG. 4 depicts a cloud computing environment according to an embodiment of the present invention.

Referring now to FIG. 4, illustrative cloud computing environment 40 is depicted. As shown, cloud computing environment 40 comprises one or more cloud computing nodes 100 with which local computing devices used by cloud consumers, such as, for example, personal digital assistant (PDA) or cellular telephone 44A, desktop computer 44B, laptop computer 44C, and/or automobile computer system 44N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 40 to offer infrastructure, platforms and/or software as services for which a cloud consumer does not need to maintain resources on a local computing device. It is understood that the types of computing devices 44A-N shown in FIG. 4 are intended to be illustrative only and that computing nodes 100 and cloud computing environment 40 can communicate with any type of computerized device over any type of network and/or network addressable connection (e.g., using a web browser).

Figure 5:
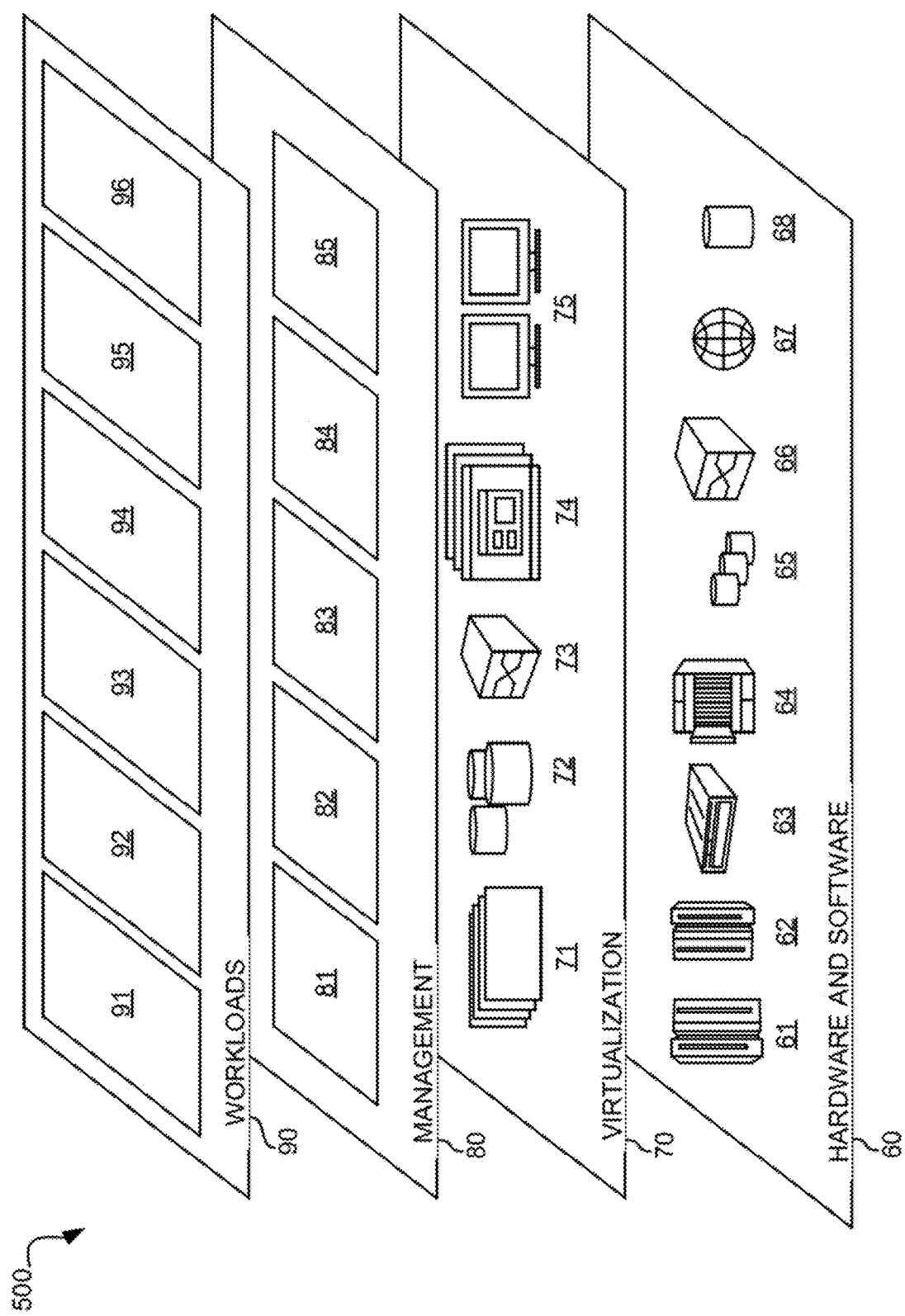
FIG. 5 depicts abstraction model layers according to an embodiment of the present invention.

Referring now to FIG. 5, a set of functional abstraction layers 500 provided by cloud computing environment 40 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and speech-to-text auto-scaling through natural language description 96. Speech-to-text auto-scaling through natural language description 96 may relate to dynamically generating metrics that correlate with the user experience and computational resources needed at any given time and allocating the computational resources necessary to keep latency within the acceptable range.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of allocating computational resources, the method comprising:
   computing a delta for each word in a transcript between a wall clock time and a time when the word is delivered to a client;
   submitting the deltas to a group of metrics servers, the group of metrics servers being configured to collect the deltas;
   requesting from the group of metrics servers current values of the deltas;
   determining whether the current values of the deltas exceed a pre-defined max-latency threshold; and
   in response to determining that the current values of the deltas exceed the pre-defined max-latency threshold, adjusting the allocated computational resources based on a frequency of the current values of the deltas that exceed the pre-defined max-latency threshold.

2. The method of claim 1, wherein the pre-defined max-latency threshold is configured to be changed in accordance with user cases having different sensitivities to latency.

3. The method of claim 1, wherein the allocated computational resources are added incrementally until the current values of the deltas fall within the acceptable range for latency.

4. The method of claim 1, wherein adjusting the allocated computational resources is based on the frequency of the current values of the deltas that fall below a pre-defined min-latency threshold.

5. The method of claim 4, wherein the pre-defined min-latency threshold is configured to be changed in accordance with user cases having different sensitivities to latency.

6. The method of claim 1, wherein the allocated computational resources are reduced incrementally until the current values of the deltas fall within the acceptable range for latency.

7. The method of claim 1, wherein computing the delta for each word in the transcript between the wall clock time and the time when the word is delivered to the client further comprises:
   creating a histogram from the current values of the deltas; and
   performing a scale-up of the allocated computational resources based on a percentage of data points that fall above the pre-defined max-latency threshold.

8. A computer system, the computer system comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   computing a delta for each word in a transcript between a wall clock time and a time when the word is delivered to a client;
   submitting the deltas to a group of metrics servers, the group of metrics servers being configured to collect the deltas;
   requesting from the group of metrics servers current values of the deltas;
   determining whether the current values of the deltas exceed a pre-defined max-latency threshold; and
   in response to determining that the current values of the deltas exceed the pre-defined max-latency threshold, adjusting the allocated computational resources based on a frequency of the current values of the deltas that exceed the pre-defined max-latency threshold.

9. The computer system of claim 8, wherein the pre-defined max-latency threshold is configured to be changed in accordance with user cases having different sensitivities to latency.

10. The computer system of claim 8, wherein the allocated computational resources are added incrementally until the current values of the deltas fall within the acceptable range for latency.

11. The computer system of claim 8, wherein adjusting the allocated computational resources is based on the frequency of the current values of the deltas that fall below a pre-defined min-latency threshold.

12. The computer system of claim 11, wherein the pre-defined min-latency threshold is configured to be changed in accordance with user cases having different sensitivities to latency.

13. The computer system of claim 8, wherein the allocated computational resources are reduced incrementally until the current values of the deltas fall within the acceptable range for latency.

14. The computer system of claim 8, wherein computing the delta for each word in the transcript between the wall clock time and the time when the word is delivered to the client further comprises:
   creating a histogram from the current values of the deltas; and
   performing a scale-up of the allocated computational resources based on a percentage of data points that fall above the pre-defined max-latency threshold.

15. A computer program product, the computer program product comprising:
   one or more computer-readable tangible storage medium and program instructions stored on at least one of the one or more tangible storage medium, the program instructions executable by a processor capable of performing a method, the method comprising:
   computing a delta for each word in a transcript between a wall clock time and a time when the word is delivered to a client;
   submitting the deltas to a group of metrics servers, the group of metrics servers being configured to collect the deltas;
   requesting from the group of metrics servers current values of the deltas;
   determining whether the current values of the deltas exceed a pre-defined max-latency threshold; and
   in response to determining that the current values of the deltas exceed the pre-defined max-latency threshold, adjusting the allocated computational resources based on a frequency of the current values of the deltas that exceed the pre-defined max-latency threshold.

16. The computer program product of claim 15, wherein the pre-defined max-latency threshold is configured to be changed in accordance with user cases having different sensitivities to latency.

17. The computer program product of claim 15, wherein the allocated computational resources are added incrementally until the current values of the deltas fall within the acceptable range for latency.

18. The computer program product of claim 15, wherein adjusting the allocated computational resources is based on the frequency of the current values of the deltas that fall below a pre-defined min-latency threshold.

19. The computer program product of claim 18, wherein the pre-defined min-latency threshold is configured to be changed in accordance with user cases having different sensitivities to latency.

20. The computer program product of claim 15, wherein the allocated computational resources are reduced incrementally until the current values of the deltas fall within the acceptable range for latency.

* * * * *